United States Patent
Hinshaw et al.

(10) Patent No.: US 9,037,533 B2
(45) Date of Patent: *May 19, 2015

(54) NETWORK INTERFACE FOR DISTRIBUTED INTELLIGENCE DATABASE SYSTEM

(75) Inventors: Foster D. Hinshaw, Somerville, MA (US); Steven T. Almy, Westborough, MA (US); David A. Utter, Princeton, MA (US); Barry M. Zane, Wayland, MA (US)

(73) Assignee: IBM International Group B.V., Amsterdam (NL)

( * ) Notice: Subject to any disclaimer, the term of this patent is extended or adjusted under 35 U.S.C. 154(b) by 26 days.

This patent is subject to a terminal disclaimer.

(21) Appl. No.: 11/900,222

(22) Filed: Sep. 11, 2007

(65) Prior Publication Data

US 2008/0046438 A1   Feb. 21, 2008

Related U.S. Application Data

(63) Continuation of application No. 10/145,564, filed on May 13, 2002, now Pat. No. 7,272,605.

(51) Int. Cl.
*G06F 7/00* (2006.01)
*G06F 17/30* (2006.01)

(52) U.S. Cl.
CPC ....... *G06F 17/30575* (2013.01); *Y10S 707/955* (2013.10); *Y10S 707/99943* (2013.01); *Y10S 707/966* (2013.01); *Y10S 707/959* (2013.01); *Y10S 707/922* (2013.10)

(58) Field of Classification Search
USPC ........... 707/3, 10, 2, 602, 638, 610, 792, 802, 707/827; 705/26, 14.54, 14; 711/114; 709/225, 107; 380/49
See application file for complete search history.

(56) References Cited

U.S. PATENT DOCUMENTS 4,868,866 A * 9/1989 Williams, Jr. .................. 380/49
5,321,813 A   6/1994 McMillen et al.
(Continued)

OTHER PUBLICATIONS

Uysal, et al., "Evaluation of Active Disks for Decision Support Databases", IEEE, 1/20000, pp. 337-348.
(Continued)

*Primary Examiner* — Thuy Pardo
(74) *Attorney, Agent, or Firm* — Mohammed Kashef; Edell, Shapiro & Finnan, LLC

(57) ABSTRACT

A database appliance in which two or more internetworked data storage units are used to coordinate the storage and retrieval of database records. One or more central database processing units are also associated with the data storage units. A network infrastructure provides the ability for the central database processors and storage processors to communicate as network nodes, with the network infrastructure using a communication protocol. A software application for executing database operations executes in a distributed fashion with portions of the database application executing on at least one central database processor and other portions executing on the data storage processors. At least a portion of the database application is implemented within and/or coordinated by a communication process that is executing the communication protocol. This coordination takes place such that data blocks are passed between the communication process and at least one portion of the database application process by passing data block reference information. In accordance with other aspects of the present invention, the communication process may have at least portions of the database application process executing within it. These database application operations executing within the same context as the communication process may include database operations such as join, sort, aggregate, restrict, reject, expression evaluation, statistical analysis or other operations.

20 Claims, 9 Drawing Sheets

(56) References Cited

U.S. PATENT DOCUMENTS

| | | | |
|---|---|---|---|
| 5,485,607 A | 1/1996 | Lomet et al. | |
| 5,581,461 A | 12/1996 | Coll et al. | |
| 5,634,053 A | 5/1997 | Noble et al. | |
| 5,758,150 A * | 5/1998 | Bell et al. | 707/10 |
| 5,845,113 A | 12/1998 | Swami et al. | |
| 6,175,832 B1 | 1/2001 | Luzzi et al. | |
| 6,175,835 B1 | 1/2001 | Shadmon | |
| 6,209,031 B1 | 3/2001 | Casey et al. | |
| 6,233,617 B1 | 5/2001 | Rothwein et al. | |
| 6,240,418 B1 | 5/2001 | Shadmon | |
| 6,240,428 B1 | 5/2001 | Yeung et al. | |
| 6,247,077 B1 | 6/2001 | Muller et al. | |
| 6,253,188 B1 * | 6/2001 | Witek et al. | 705/14.54 |
| 6,253,240 B1 | 6/2001 | Axberg et al. | |
| 6,260,044 B1 | 7/2001 | Nagral et al. | |
| 6,298,386 B1 | 10/2001 | Vahalia et al. | |
| 6,349,351 B1 | 2/2002 | Shimizu et al. | |
| 6,389,460 B1 | 5/2002 | Stewart et al. | |
| 6,427,173 B1 | 7/2002 | Boucher et al. | |
| 6,575,361 B1 | 6/2003 | Graves et al. | |
| 6,629,153 B1 * | 9/2003 | Gupta et al. | 719/316 |
| 6,665,689 B2 | 12/2003 | Muhlestein | |
| 6,760,808 B2 | 7/2004 | Peters et al. | |
| 6,829,611 B2 | 12/2004 | Majewski et al. | |
| 6,973,455 B1 | 12/2005 | Vahalia et al. | |
| 7,142,650 B1 * | 11/2006 | Kult et al. | 379/112.01 |
| 7,542,921 B1 * | 6/2009 | Hildreth | 705/26 |
| 2002/0013832 A1 | 1/2002 | Hubbard | |
| 2002/0091710 A1 | 7/2002 | Dunham et al. | |
| 2002/0116457 A1 | 8/2002 | Eshleman et al. | |
| 2002/0143943 A1 * | 10/2002 | Lee et al. | 709/225 |
| 2002/0162047 A1 | 10/2002 | Peters et al. | |
| 2003/0140085 A1 * | 7/2003 | Moir et al. | 709/107 |
| 2004/0205042 A1 * | 10/2004 | Ritter et al. | 707/2 |
| 2004/0243763 A1 * | 12/2004 | Peters et al. | 711/114 |
| 2007/0016727 A1 * | 1/2007 | Peters et al. | 711/114 |
| 2008/0147678 A1 * | 6/2008 | Peters et al. | 707/10 |

OTHER PUBLICATIONS

Drapeau, et al., "RAID-II: A High-Bandwidth Network File Server", IEEE, 1994, pp. 234-244.

* cited by examiner

NETWORK INTERFACE FOR DISTRIBUTED INTELLIGENCE DATABASE SYSTEM

RELATED APPLICATION

This application is a continuation of U.S. application Ser. No. 10/145,564, filed May 13, 2002 now U.S. Pat. No. 7,272,605. The entire teachings of the above application(s) are incorporated herein by reference.

BACKGROUND OF THE INVENTION

The present invention relates generally to database systems and more particularly to techniques for implementing database application intelligence in communication processes associated with mass storage sub-systems.

Special purpose data processing hardware and application software that is optimized for the retrieval, update, and restoration of large amounts of information are generally known as database applications or database sub-systems. Database applications find use in a variety of information-intensive areas where relatively large amounts of data need to be stored and accessed reliably. Such systems find their most common use in the data processing systems that support mission-critical commercial applications. For instance, a bank may typically use a large central database sub-system in order to store customer account and specifically individual transaction information. Similarly, a large retail manufacturer may maintain databases containing references to millions of pages of files representing the details associated with a large number of customer transactions.

However, even most medium sized organizations have now adopted a client-server data processing model where centralized storage sub-systems are accessed through network connections such as the Internet, intranets, private networks, and the like. This architecture permits certain portions of application software to execute on client computers and other portions to execute on special purpose centralized database information appliances.

An important design trend in the area such storage sub-systems is to move the amounts and kinds of work that were traditionally performed by a host processor serving a large disk array down to specialized processors or disk controllers associated with each mass storage device. This has the distinct advantage of making minimum demands on often over-utilized centralized host processors while allowing simultaneous operations on the same data to occur in or as close as possible to the storage devices themselves. These storage sub-systems offer the opportunity to offload file system and storage management functionality from the dedicated server machines and instead execute many requests directly or in parallel at the storage devices, without server intervention.

Indeed, suggestions have even been made that application-specific code may be executed at the storage devices on behalf of clients and/or servers to considerably improve application input/output (I/O) performance. Remote execution of the code directly at the storage devices allows, for example, data filtering operations to be performed as close as possible to the data. This allows for optimization of time-sensitive transfers, and further supports management functions to be customized and updated without firmware or hardware upgrades. In general, such an architecture makes possible complex or specialized operations on a far more efficient basis than a general purpose storage interface might normally otherwise support. See, for example, Acharya, A., et al, "Active Disks: Programming Model, Algorithms and Evaluation," October 1998, Proceedings of the 8th International Conference on Architectural Support for Programming Languages and Operating Systems ASPLOS VIII, and Gibson, G. A., et al. in "File Systems for Network-Attached Secure Disks," July 1997, CMU-CS-97-118.

SUMMARY OF THE INVENTION

Despite the trend to push database application intelligence from centralized processors as close as possible to the disk controllers themselves, there remain a number of unsolved problems with such an architecture. For example, as disk devices are connected in computer networks, there is a tendency to want to have them communicate in a manner which is compatible with standard Open System Interconnect (OSI) layered communication protocols. This permits, for example, each internetworked storage device to communicate with other storage devices and/or central database processors via commonly used data networking protocols such as Transmission Control Protocol/Internet Protocol (TCP/IP), which in turn permits industry-standard internetworking devices to be used. However, this choice has the effect of forcing layered communication protocols that were intended for long-haul communication networking applications into a database appliance end use, and introduces a layer of complexity and delay into the efficient processing of database application primitives.

Other complexities evolve from the fact that standard layered communication protocols in use are intended for reliable, long haul communications over unreliable communication channels. However, in internetworked database sub-systems it is quite often the case that the individual communicating units are connected over relatively short distances and, indeed, may actually be physically resident in the same hardware rack. The use of complicated reliable delivery mechanisms therefore unnecessarily delays and complicates the communication of messages between database application appliance system elements.

Briefly, the present invention is directed to a technique for implementing a database appliance in which two or more internetworked data storage units are used to coordinate the storage and retrieval of database records. A central database processor is also associated with the data storage units. The central database processor receives a database query primitive or other operation for execution and determines a strategy for distributing the work among the data storage processes. A network infrastructure is provided for the ability to communicate data among the data storage processors and the central database processor. A data storage processor may also serve as a central database processor. Alternatively, a central database processor may be a separate device.

In accordance with one novel aspect of the present invention, a software application for executing database operations proceeds in a distributed fashion with portions of the database application executing on the central database processor and other portions executing on the data storage processors. At least a portion of the application is implemented within and/or coordinated by a communication process that is also implementing a communication protocol. This coordination takes place such that data blocks are passed between the communication process and at least one portion of the database application process by passing data block reference information without copying the actual data blocks.

Such an implementation may be achieved by using a pointer to a common data storage area that is accessible by both the application and the communication process. The data block may then be passed between the application and communication processes by reference to a particular storage area such as through a pointer or index into a table or list of objects or blocks.

While the invention requires at least one communication layer in the communication process to be communicating with an application in this fashion, it is certainly the case that other communication layers in a standardized communication protocol may also pass data block information by reference between them.

As a result of communicating in this fashion, by providing the application and communication processes access to a common data storage area, it should be understood that a sending application process might not release an allocated data block until a receiving application layer acknowledges a receipt and indicates that it may be released.

In accordance with other aspects of the present invention, the communication process may have at least portions of the database application process executing within it. These database application operations executing within the same context as the communication process may include database operations such as join, sort, aggregate, restrict, reject, expression evaluation, statistical analysis, or other operations. These database application operations may execute in a network interface component.

Certain types of decisions such as routing decisions may thus be made efficiently by the communication process given that it is aware of the application payload data format. For example, data formats of particular types, such as streaming data types, may be used to communicate an integral number of database records in each communication packet. Other data communication formats may contain groups of related database objects. This permits the application to more efficiently process the packets as quickly as possible, as they are received, rather than waiting for a complete message at a particular communication layer, such as a complete TCP/IP message at a transport layer portion of the communication process, to be received prior to beginning database operations.

In yet another implementation of the present invention, the application process may be operated with a communication process that does not use reliable delivery network protocols. In this implementation, the application process is augmented with a reliable delivery paradigm for communicating lower layer messages. This, for example, may be a reliable delivery paradigm that is an end-to-end acknowledgment. Thus, rather than having the end-to-end acknowledgement functionality being performed by a network communication layer such as a Transmission Control Protocol (TCP) type protocol, a User Datagram Protocol (UDP) type transport layer protocol that does not have such mechanisms may be used. The database application itself is instead augmented with the end-to-end acknowledgment mechanism.

This approach also permits the application to communicate the end-to-end acknowledgment as part of other messages that are not specific delivery acknowledgment messages. Acknowledgment messages can also be sent after the expiration of a predetermined period of time, in the absence of other messaging.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
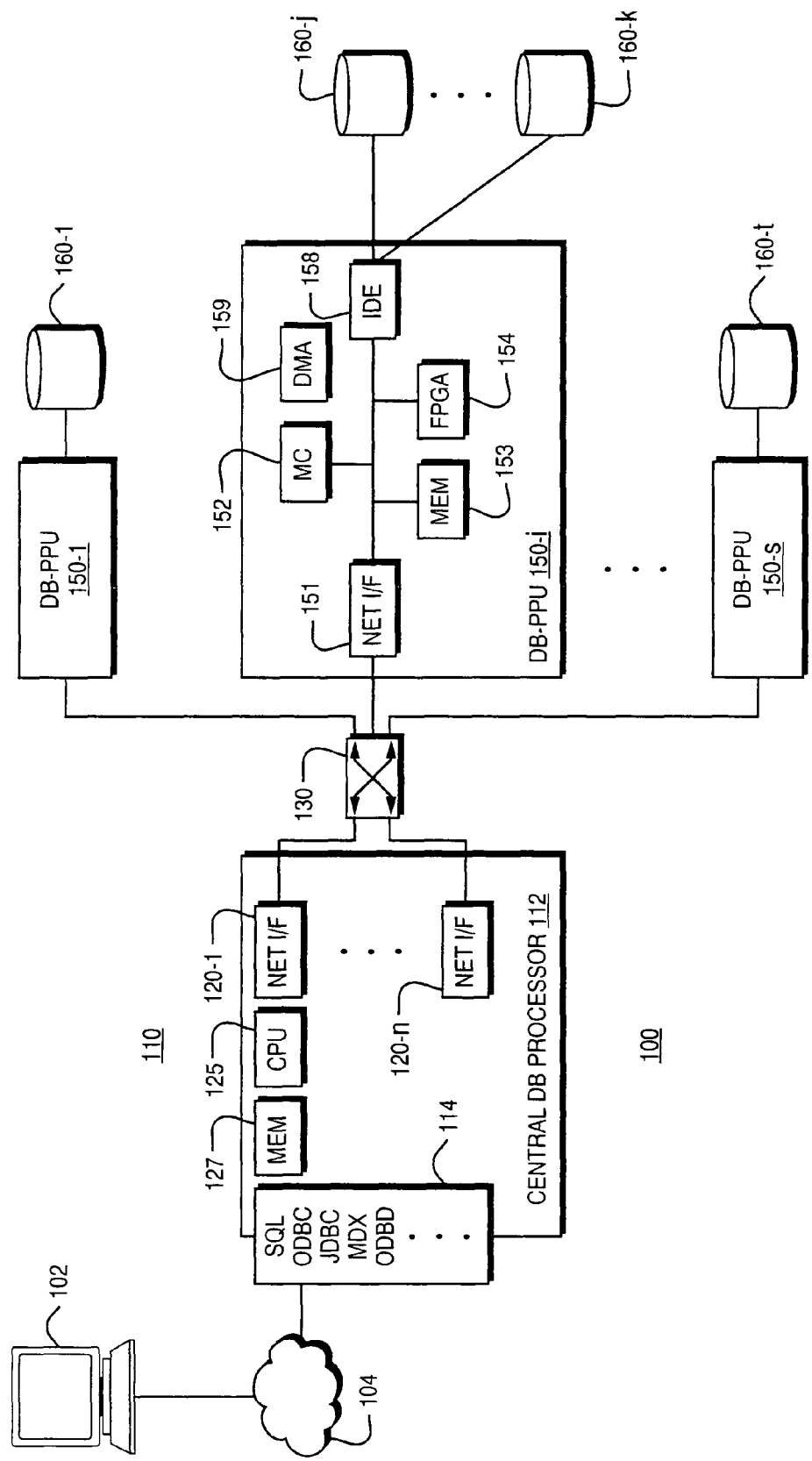
FIG. 1 is a block diagram of a data processing system that operates as a distributed networked database appliance according to the invention.

The present invention provides for efficient, reliable streaming transmission of database information across a network between a sender and one or more receivers. FIG. 1 is illustrative of a system architecture 100 in which the invention may be used. The system 100 consists of a user interface or client device 102, a generalized computer network connection 104, a central database processor 110, a data network 130, one or more database operation processing units (DB-PPUs) 150-1, 150-*i* . . . , 150-*s*, and a plurality of mass storage devices such as disk drives 160-1 . . . 160-*j*, . . . 160-*k*, . . . 160-*t*. A database is stored and accessible on the disk drives 160, which may be mirrored, striped, or formatted in a number of different ways. It should be understood that more than one physical disk drive 160-*j*, . . . , 160-*k* may be associated with a particular database operation processing unit 150-*i*. Examples of databases that can be stored and operated on by this system include but are not limited to hierarchical, relational, object-relational, XML, file system, index sequential access method, multimedia (video, BLOB, streaming), and in-memory data. While the examples discussed herein generally refer to database records, it should be understood that the present invention applies to any type of object that may be stored in a database.

In operation, a user through the client device 102 formulates a query for information stored in the database. The query, which may take the form of a network level message, passes through the network 104 to the central database processor 110. The central database processor receives the query through an interface 114, which may be a database application layer interface suitable for receiving database queries that take any number of standard forms. The query is parsed and an execution plan is developed and optimized for its execution by the central database processor 110.

Once an execution plan is in place, the central database processor 110 sends one or more messages to the database operation processing units 150 via internetworking devices 130 to retrieve and/or operate on various portions of the database as required by the query. The central database processor 110 may include one or more Central Processing Units (CPUs) 125 and one or more memory(s) 127 operating in parallel or in other multiprocessor configurations.

Each CPU may be a general purpose CPU or other execution engine such as a Digital Signal Processor (DSP), microcontroller, microprocessor, Field Programmable Gate Array (FPGA), Application Specific Integrated Circuit (ASIC) or the like.

In the case of the illustrated preferred embodiment, the network is principally comprised of Local Area Network (LAN) internetworking components 130 so that the messages travel through the network interface components 120-1, . . . 120-n associated with each database operation processing unit 150. The network interface components 120 may be network interface cards, switches or routers, Fibre Channel transceivers, InfiniBand-enabled devices, or other devices programmed to transmit and receive messages according to standardized data network protocols. These protocols may include Ethernet for a media access control (MAC) layer, Internet Protocol (IP) for a network layer, and/or User Datagram Protocol (UDP) or Transmission Control Protocol (TCP) for a transport layer.

The internetworking devices 130 may be any convenient and proper network connection device or devices such as switches, routers, gateways, and the like. It should be understood that the internetworking devices 130 may comprise a Local Area Network (LAN) typically intended for connecting in a situation where the central database processor 110 is located at the same site as the database operation processing units 150. However, it should also be understood that Wide Area Network (WAN) internetworking equipment 130 may also be used when the central database processor 110 is physically separated from one or more of the database operation processing units 150.

The present invention is specifically concerned with facilitating efficient, reliable transmission of data between a sender and one or more receivers. It should be understood that, although the following discussion proceeds for the most part assuming that the sender is a database operation processing unit 150 and the receiver is a central database processor 110, the situation may be reversed, with the central database processor 110 being the sender and one or more of the database operation processing units 150 being the receiver. In addition, both the sender and the receiver may be database operation processing units 150. In the normal case, most of the communication operations will be involved with retrieving records from the database while processing queries, as opposed to storing them, and therefore the majority of traffic flow is from the database operation processing units towards the central database processor 110 when processing queries.

An exemplary database operation processing unit 150-i consists of a network interface component 151, microcontroller 152, memory 153, programmable logic 154, and a storage interface such as an Integrated Device Electronics (IDE) interface 158.

In general, a sender passes a pointer for data directly between the communication layer processes and the database application process rather than copying the data blocks themselves from each successive communication layer process. For example, in a prior art system an application program running on the microcontroller 152 may be instructed to retrieve data from the disk 160-j. Data begins streaming from the disk 160-j through the IDE interface 158 to the microcontroller 152. The application process running on the microcontroller 152 then forwards the retrieved data to the network interface component 151, which then formats the data into UDP/IP packets. A packet may be either a complete message or part of a larger message. At the network interface component, the data received from the database application process running on the microcontroller 152 would then be forwarded to a transport layer (UDP) running within a communication process on the network interface component 151, which in turn forwards the data to a network layer process (IP), and finally to a media access and physical layer (Ethernet) for communication over the internetworking devices 130.

In accordance with the present invention, portions of the application process running on the microcontroller 152 and the communication processes running on the network interface component 151 have access to a common memory area 153. This permits data to be instead passed via Direct Memory Access (DMA) or other memory access methods using pointers between the application process and network communication processes. When the system is running in "reliable" mode, this requires that portions of the memory 153 remain resident in the sending database operation processing unit 150 until the receiving application at the central database processor 110 confirms receipt of the associated packet(s). However, it does avoid the need to successively allocate and release memory by the application process, the communication process, and indeed, even each network protocol layer within the communication process, as such data would otherwise be copied and re-copied. If the system is running in so-called "unreliable" mode, the memory 153 may be released as soon as the associated packet(s) are sent, and therefore before their receipt at the central database processor 110.

Figure 2:
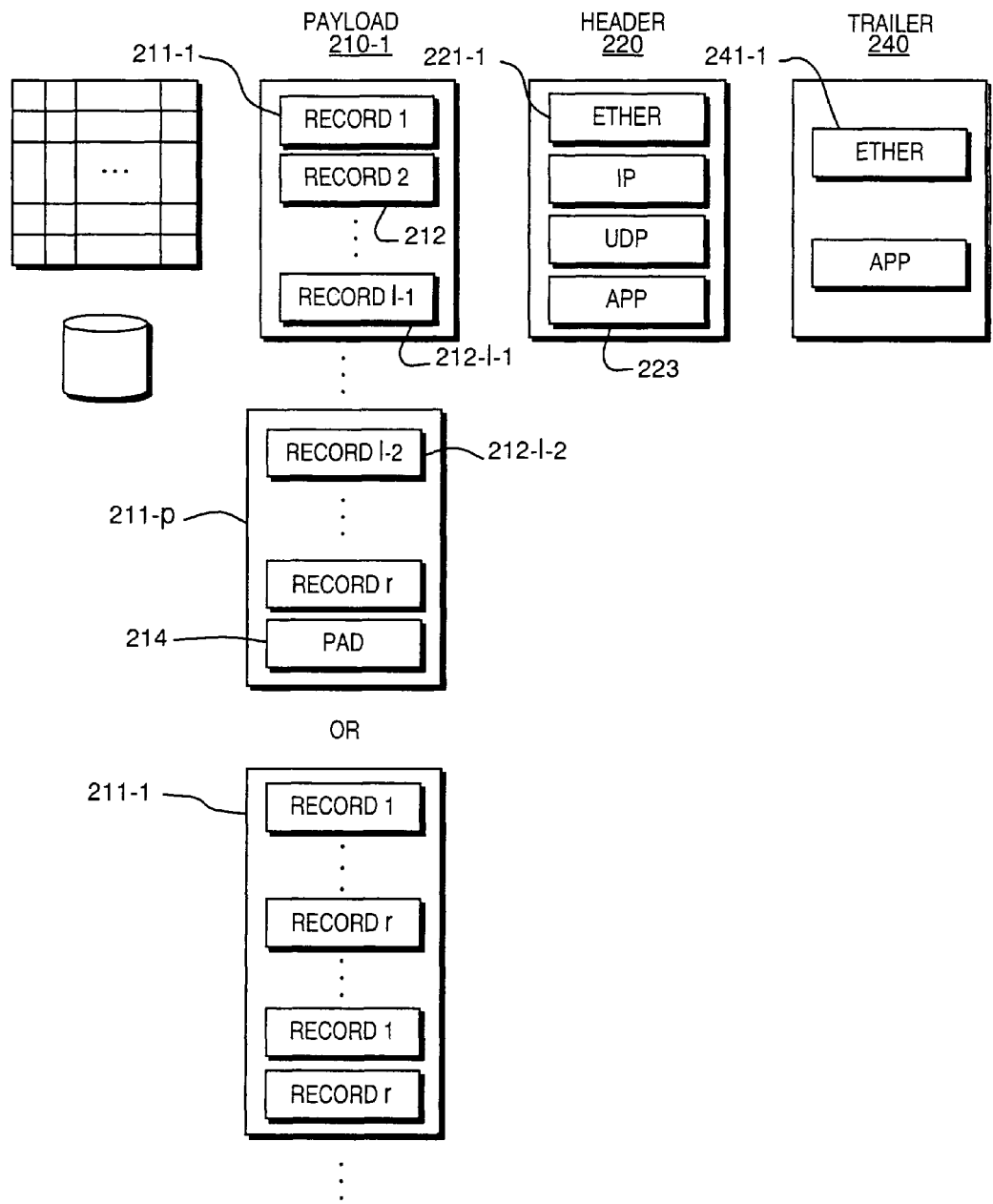
FIG. 2 is a more detailed view of how a packet is assembled by a communication process that is aware of application process data formats.

Turning attention now to both FIG. 1 and FIG. 2, consider one example of how the results of a query processed by a database application are formatted by the communication process. In this example, the database may include order records for a garment wholesaler and the query may be requesting a list of identification numbers for those customers who are located in North Carolina. Upon receiving the query, the database operation processing unit 150-i accesses a portion of the database stored on one of the disks 160-j, 160-k. In particular, the microcontroller 152 operating on instructions given to it by the central database processor 110 makes one or more accesses to the disk 160-j to produce records indicative of results of the query. The query logic is fed to the microcontroller 152 which then retrieves the requested records, i.e., the customer identification numbers of customers who are located in North Carolina.

In a next step, the records are first stored in a block 210-1 in an area of the memory 153 dedicated to the database application. It should be understood that a record set may be so large that it spans more than one block 210-1, . . . , 210-p of the memory 153. A block may contain a non-integral number of records: that is, a given record L 212 may itself span across more than one memory block 210 thus comprising a partial record 212-L-1 in a first block 210-1 and a partial record 212-L-2 in a second block 212-p. Alternatively, the entire record set, and therefore an integral number of records is stored in a single memory block 210-l. In addition, a record set may span multiple blocks with each block containing an integral number of records. It is possible for records to be split across block boundaries or not. The point is that the relationship between the number of records 212 and the number of blocks 210 that are used to transmit them is really not critical to the present invention.

A pointer 211-1 is maintained that indicates the location and length of the data to be included in each packet. This data set may be referred to as the "payload" for that packet. It should be noted that the packet size may be a function of the network protocols used in a particular implementation. A packet may contain a partial record, a single record, or many records, depending on the size of the records and the allowable payload size. A zero pad section 214 may be required to fill out one or more packets for protocols which require a minimum packet size. If, on the other hand, a record set result is too large to be transmitted in a single packet, it will be transmitted in multiple packets, each of which may contain an integral or non-integral number of records. In this instance, the pointers 211-1, 211-2, . . . 211-*p* will be updated for each successive payload.

Next, in order that the data be transmitted properly via a conventional internetworking infrastructure 130 that includes standardized routers and switchers, appropriate header and trailer information must be added to the payload as required by the network protocols in use. In the illustrated example, Ethernet is used as a Media Access Control (MAC) layer protocol, Internet Protocol (IP) is used as a network layer protocol, and User Datagram Protocol (UDP) is used as a transport layer protocol. A second block 220 is then set aside in the memory 153 for storing headers associated with each of these communication protocol layers.

A portion 223 of header block 220 is used for storing header information specific to an application layer. This application header 223 may, for example, indicate information consisting of data type, a destination identifier, a sender identifier, a return identifier, a release flag, and a reliability flag. The data type parameter, for example, may indicate that the payload consists of a record set of a specific, integral number of database records. Other data types may be used such as binary data, data files, binary objects, XML, or control messages being passed at the application layer. One possible header block format is discussed in more detailed below in connection with FIG. 5.

A destination identifier indicates the address of one or more receivers where the packet is to be sent, in this instance the IP address and MAC layer address of one or more network interface components 120-1 . . . 120-*n* associated with the central database processor 110. It should be understood that the destination may be any network node, including one or more network interface components 120-1 . . . 120-*n* associated with the central database processor 110 or one or more database operation processing units 150-1, 150-*i* . . . , 150-*s*. The sender identifier holds the sender's address information, in this instance the IP address and MAC layer address of the database operation processing unit 150-*i*. It should be understood that the sender may be any network node, including a network interface component 120 associated with the central database processor 110 or an database operation processing unit 150-1. A return identifier indicates the address where a result set should be returned, which may be the sender or another network node. The release flag and the reliability flag are used to tell a communication layer when to release the blocks 210, 220, and 240 allocated in the memory 153. The uses for these flags will also become more apparent from the description below.

It should be understood that, depending on the values of the release and reliability flags, a communication layer may release the memory blocks after the associated message has been transmitted and acknowledgment has been received, or may release the memory blocks after the associated message has been transmitted but without waiting for acknowledgment, or may not release the memory blocks at all.

It is also possible for the application header 223 to be stored in a separate block (not shown in FIG. 2) or to be absent altogether. In an instance when the headers are stored in separate blocks, the application header 223 may be updated without updating other headers.

Finally, a trailer block 240 may be constructed containing information associated with the Ethernet and application layer trailers which typically include, for example, cyclic redundancy check (CRC) information. It should be understood that the CRC information may be created by either hardware or software. In the illustrated embodiment, both the Ethernet and application layer trailers are stored in the same block 240. The Ethernet and application layer trailers may also be stored in separate blocks. The application layer trailer may be altogether absent. In an instance when the trailers are stored in separate blocks, the application layer trailer may be updated without updating the Ethernet trailer.

To transmit the payload, pointers to the communication process components of the packet, which might include the header block 220, payload blocks 210, and trailer block 240, are sent to a communication process or thread running in the network interface component 151. These pointers specify the locations of the data blocks. The information needed to construct the packet is thus not passed by physically moving the memory data from the memory 153 to the network interface component 151, but rather by passing the pointers 221, 211, and 241 associated therewith. Because the memory 153 is accessible by the communication process as well as the database application, the communication layer processes running in the network interface component 151 may access the associated memory locations directly in order to formulate the packet and then route it on to the internetworking infrastructure 130.

If the record set is fragmented across multiple data blocks 210 or if a block 210 contains more records than can fit in a packet, the pointer 211 is updated to identify the payload for the next packet. The header 220 and trailer 240 blocks are updated as needed for each packet. The next set of pointers 221, 211, and 241 are sent to the communication process layer to assemble the next packet. This process continues until the entire record set has been transmitted.

Figure 3:
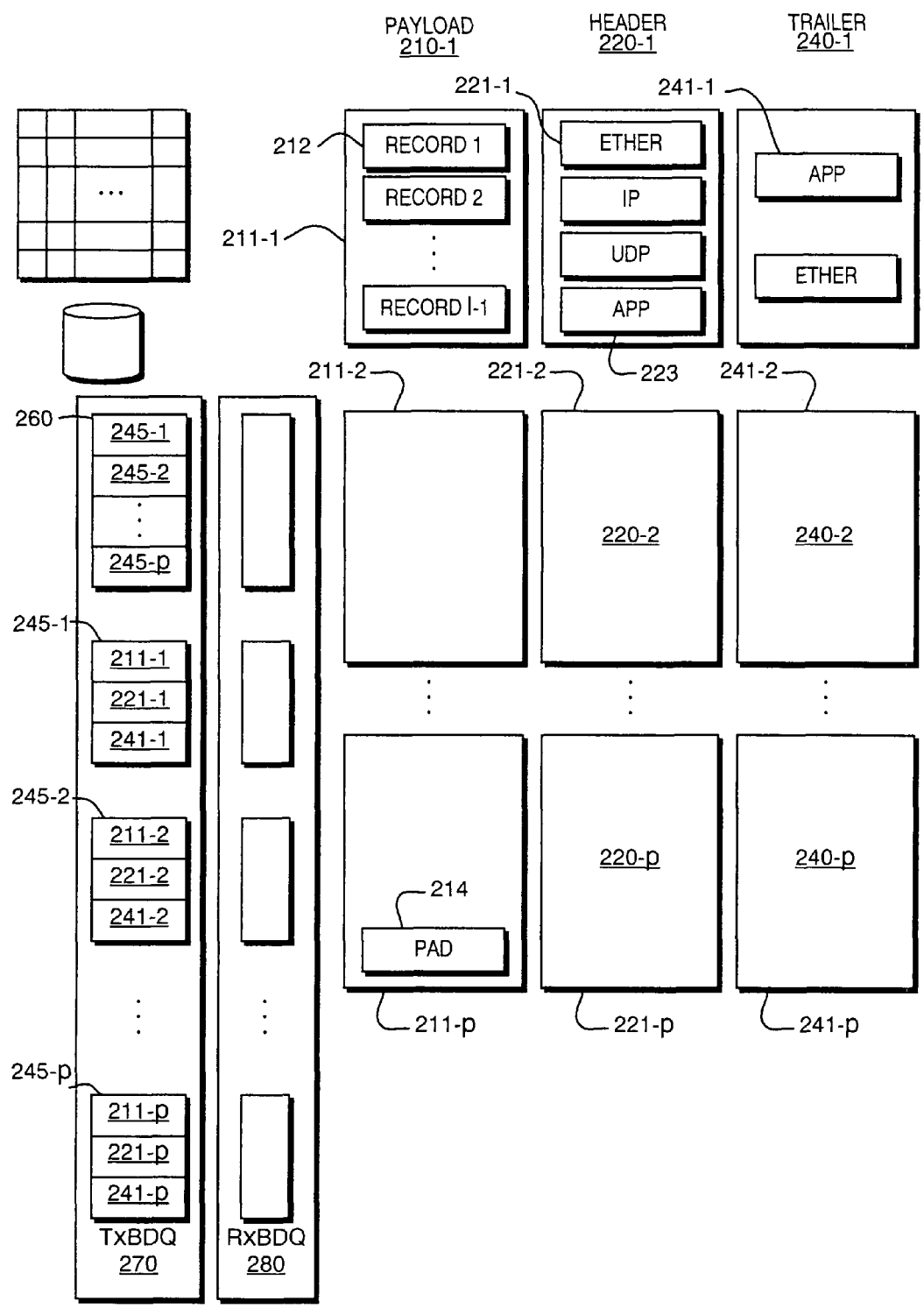
FIG. 3 is a detailed view of how packets may be assembled if the system uses Direct Memory Access (DMA) techniques.

The foregoing steps can be performed as part of a communication software process running in the database operation processing unit 150. However, a second embodiment of the invention is shown in FIG. 3, where a Direct Memory Access (DMA) controller is available. In this instance, the headers 220, payloads 210, and trailers 240 required to transmit an entire record set can be pre-built and stored in separate memory blocks. A Direct Memory Access (DMA) controller 159 in the database operation processing unit 150 (FIG. 1) assembles and transmits the packets entirely in hardware. A transmit buffer descriptor queue (TX BDQ) 270 on the sender contains a list 260 consisting of groups of pointers 245-1, 245-2, . . . 245-*p* that each point to a respective list of pointers 221-1, 211-1, 241-1; 221-2, 211-2, 241-2; . . . 221-*p*, 211-*p*, 241-*p* to the memory blocks in which the header information, payload, and trailer information for each packet are stored. The DMA controller on the sender reads the transmit buffer descriptor queue, builds the packets, and transmits them. On the receiver, a return buffer descriptor queue 280 contains a similar list of pointers to memory locations that are pre-allocated by a receiver process. Memory may be pre-allocated on the receiver to ensure that sufficient memory is available for each payload because it cannot be guaranteed that there is enough contiguous memory available on the receiver to contain the entire record set. As data comes into the receiver, the DMA controller on the receiver reads the return buffer descriptor queue to determine the memory locations in which to store the data contained in the packets, and then stores the data in those memory locations.

It should be understood that it would also be possible, in a case where the network interface component 151 was accessible by the application and had an available memory space, that the various data structures described herein might also be stored within the network interface component 151 itself.

Whether or not the communication process layer uses DMA to assemble and receive the packets, once a data packet is assembled, it travels through the internetworking infrastructure 130 and arrives at a receiver such as one of the network interface components 120-*n* associated with the central database processor 110. The communication process at the receiving network interface component 120-*n* receives each packet and extracts the payload.

The receiver validates each packet using the checksums in the headers and/or trailers. For example, IP and UDP headers typically contain checksums with the Ethernet trailer containing a cyclic redundancy check (CRC). To add another layer of reliability, an end-to-end CRC may be created in the application layer trailer and this may be used to validate the packet. The significance of doing so is that a single CRC can be calculated quickly in the streaming mode at the application layer.

After the packet is validated at the receiver 120-*n*, if it then has to be acknowledged, an acknowledgment message is sent so that the related memory 153 blocks at the sender can be released.

In the illustrated embodiment, the payload 210 may be operated upon by the part of the application that resides on the network interface component 120-*n*. The resultant data from those operations are passed to subsequent application layers in the CPU 125 on the central database processor 110. It should be understood that the receiver could be a database operation processing unit 150-*i*, in which case the payload might pass through the network interface component 151 before being passed to the application layer in the microcontroller 152.

Figure 4:
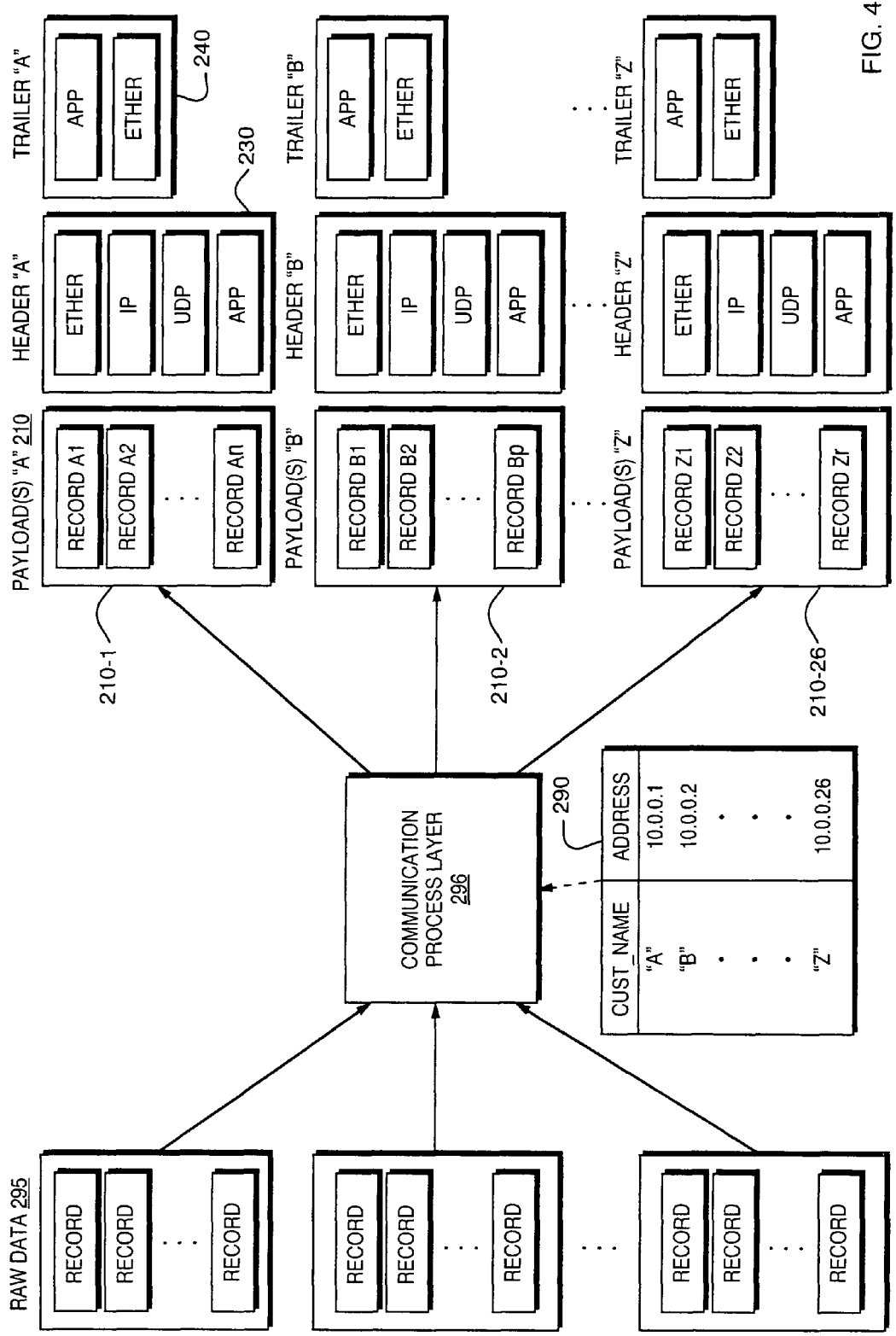
FIG. 4 illustrates how a key distribution table may be used to build packets.

One example of such an operation is discussed below in connection with FIG. 4. Similarly, records that do not match pre-programmed criteria may be discarded at this point prior to their being passed to subsequent application processes.

The transmission of the data from the application at the database operation processing unit 150 may be initiated with an application program interface (API) command such as the following:

NETSEND (dest, data_pointer,{other})

This NETSEND command indicates a destination address for the data and a data_pointer 211 to a memory location containing the first block 210 of data. NETSEND may have other parameters, such as application header information, whether or how memory should be allocated and/or released during the process of transmitting the packet, return address, reliability flag, payload type, query priority, query identifier, and any pre-transmission processing of the data, which may include database operations. The communication process layer can then assemble the necessary header 221 and trailer 241 information.

This 'zero copy' communication layer scheme thus avoids copying data as it travels up and down successive network and application layer processes. In a preferred embodiment, there is only one consolidated, or application I/O, layer. The memory used may be in shared space or application space, and the communication layer can release memory in either shared space or application space.

In another embodiment, the destination address may be omitted, and the communication process layer can assemble packets based on address lookup for any defined distribution key. A distribution key determines the target network node based on the content of the data. One example of a use of a distribution key is shown in FIG. 4. Here, a distribution key table 290 is used in the process of assembling payloads 210 from raw data blocks 295 in the communication process layer 296. Specifically, the communication process layer 296 has been given access to a distribution key table 290 that indicates for each customer on a customer list where customer records may be routed. The specific distribution key table 290 illustrated in FIG. 4 is in effect an instruction to route all customer records having a last name beginning with "A" to be directed to a particular network node, for example, address 10.0.0.01. Likewise, records relating to a customer having a last name beginning with "B" are routed to address 10.0.0.2 and so on with records for customers having a last name beginning in "Z" being routed to address 10.0.0.26.

The information in the key distribution table 290 is then used by the communication process layer in order to determine where to route assembled packets. Payloads intended for specific destination addresses can then be queued separately from each other. For example, all payloads intended for the address associated with customers having a last name beginning with "A" can be associated with a payload 210-1 being assembled to be routed to the specific destination 10.0.0.1. Appropriate headers 220 and trailers 240 are associated with this payload 210-1 so that it may be properly transmitted. Similar payloads 210-2, . . . , 210-26 can then be assembled for each of the other addresses in the key distribution table 290.

This approach provides an additional advantage in that parts of the application database processing may be embedded within conventional network layer handling processes. For instance, normally the network layer on the receiver side must pass the data payload to the application layer, which then operates on it. In a preferred embodiment, this approach instead permits the network layer to validate the header, and, based on that header, begin to perform some database operations on the payload before passing it to the application layer.

Figure 5:
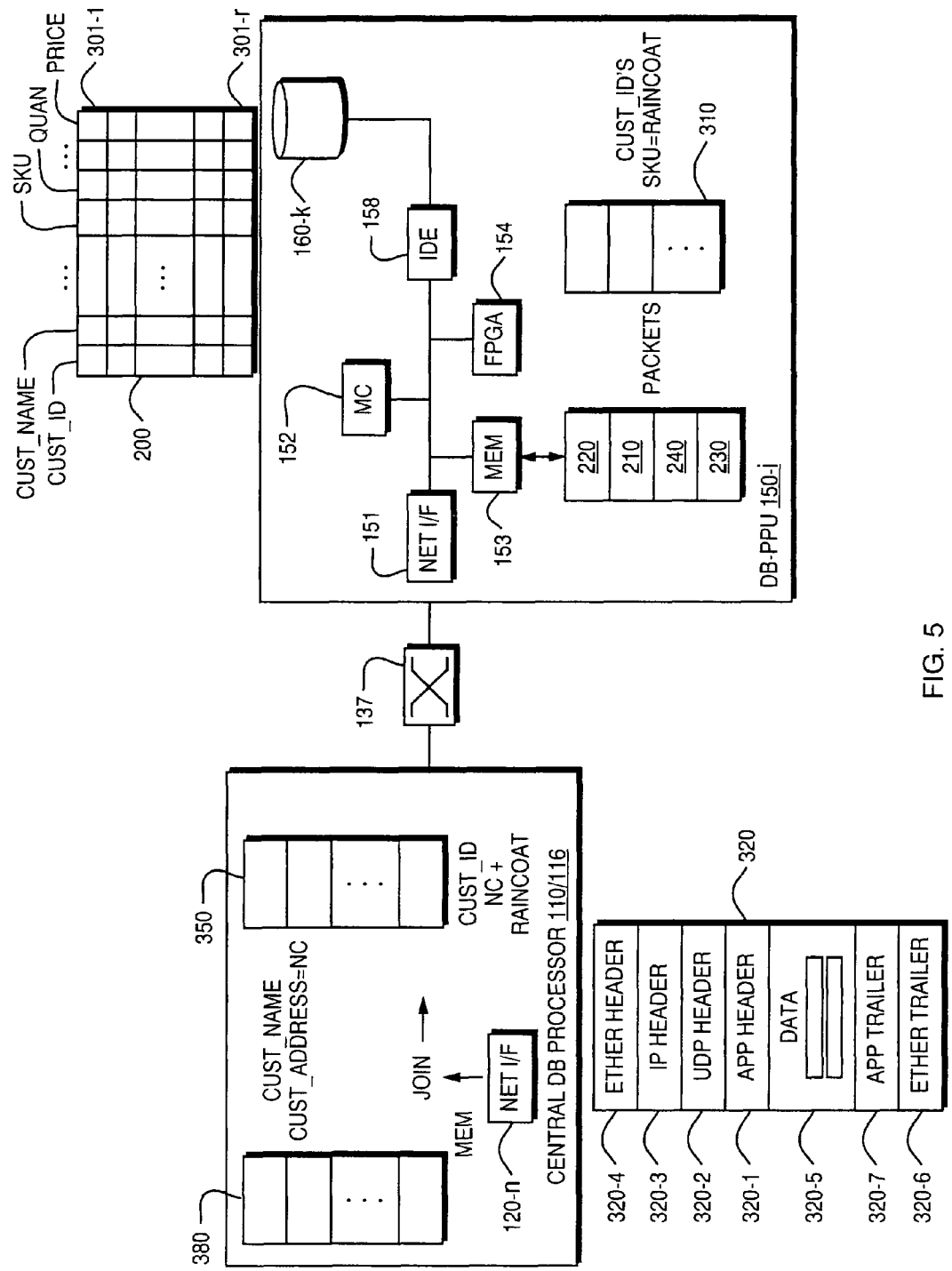
FIG. 5 illustrates how the communication process may participate in database application operations.

Turning attention to FIG. 5, a scenario is shown for the processing of a query where the information requested is to determine the customer IDs for customers that are located in North Carolina and who have purchased raincoats.

As explained previously, the orders database 200 contains a number of records 301-1, . . . 301-*r* associated with the order transactions. Each record in the orders database 200 may include a number of fields such as a customer ID, customer name, stock number (SKU), quantity ordered, color, price, and other information associated with an order.

The database operation processing unit 150-*i* may be programmed to retrieve the customer IDs of those customers who have ordered raincoats. In this scenario, the disk is scanned and data returned where "SKU=raincoat" is then made available in the memory 153 of the database operation processing unit 150-*i*. The communication process layer then packetizes these records 212 and forwards the formatted messages through the network interface component 151 and networking infrastructure 130 and finally to the central database processor 110.

Upon arrival at the central database processor 110, each packet 320 has a form as shown, including an application layer header 320-1, UDP header 320-2, IP header 320-3, Ethernet header 320-4, a data payload 320-5, and a trailer portion consisting of an Ethernet trailer 320-6 and application layer trailer 320-7. In a preferred embodiment, the data payload may have an integral number of records. The network layer processing in the network interface component 120 is aware of what has to be done to the data 320-5, either from the application layer header 320-1 or because it was pre-programmed to perform a certain operation on data returning with a specific query identifier in the application header 320-1, which may be passed as a parameter to NETSEND.

As a result, the payload 320-5 may have certain database operations performed upon it before it is passed up to a higher layer processor or to a central processing unit 125. In this example, the central database processor 110 may have previously made available either in a common memory location on the central database processor 110 or in memory in an intelligent network interface component 120 a table of customer IDs and customer names 380 where the customer address is in North Carolina. The communications process begins to process each packet with the appropriate operation for that query.

In a streaming manner, after the headers pass through, the communications layer continues to process records with the appropriate operation. For example, the records 212 from the packet 320 may then be subjected to a database operation such as a "join". The join can be performed against elements of the customer address table 380 resulting in a results table 350. The results able 350 as a result of the join operation will then contain the customer IDs of only those customers that are located in North Carolina and who have purchased raincoats.

In fact, table 350 does not have to be materialized. If an incoming record from packet 320 matches a customer ID in the customer address table 380, then the communications process passes the corresponding customer name to the application process for further operations. Where the incoming records do not match a customer ID, they are discarded by the communication process and are never passed to the application process.

Because this database operation is completed in the communication process, the CPU 125 and other elements of the central database processor 110 are far more efficiently utilized. In particular, because the same process is both validating the network layer headers 320-2, 320-3, and 320-4 and running the database application 'join' operation, data never leaves the local cache memory of the processor performing these operations. One benefit of this is that a massively parallel processing structure may be created by running multiple network interface components in parallel without impacting the central database processor CPU.

Providing access in the communication process to the application header information 223 provides additional advantages in determining how to transmit the data. In particular, the payload type field may be used to indicate that the data is, for example, appropriately sent as a streaming type of data. Having payload type information allows the communication layer to determine the packetization format for the data and other optimized transmission parameters based upon the characteristics of the data. For example, when streaming data is expected, UDP with jumbo Ethernet. frames (e.g., 9000 bytes) may be used. Otherwise, for example, when the data is a control message, TCP with normal Ethernet frames (e.g., 1500 bytes) may be used for sending the data.

Prioritizations can also be set up based upon the payload type or query priority. For example, when streaming data is expected to be sent, it may be given higher priority for processing by the communication layer than maintenance data. In an instance where many small records result from a query, a decision can be made to pack as many records as possible into a single packet or to group related packets together.

Information in the application header may be used for other purposes, such as using the query identifier for routing. For example, before sending a query to the database operation processing units 150, the communications layer populates a table with a list of query identifiers and process identifiers. When a packet comes in with a query identifier on the list, the communications layer returns the data to the corresponding process.

Figure 6:
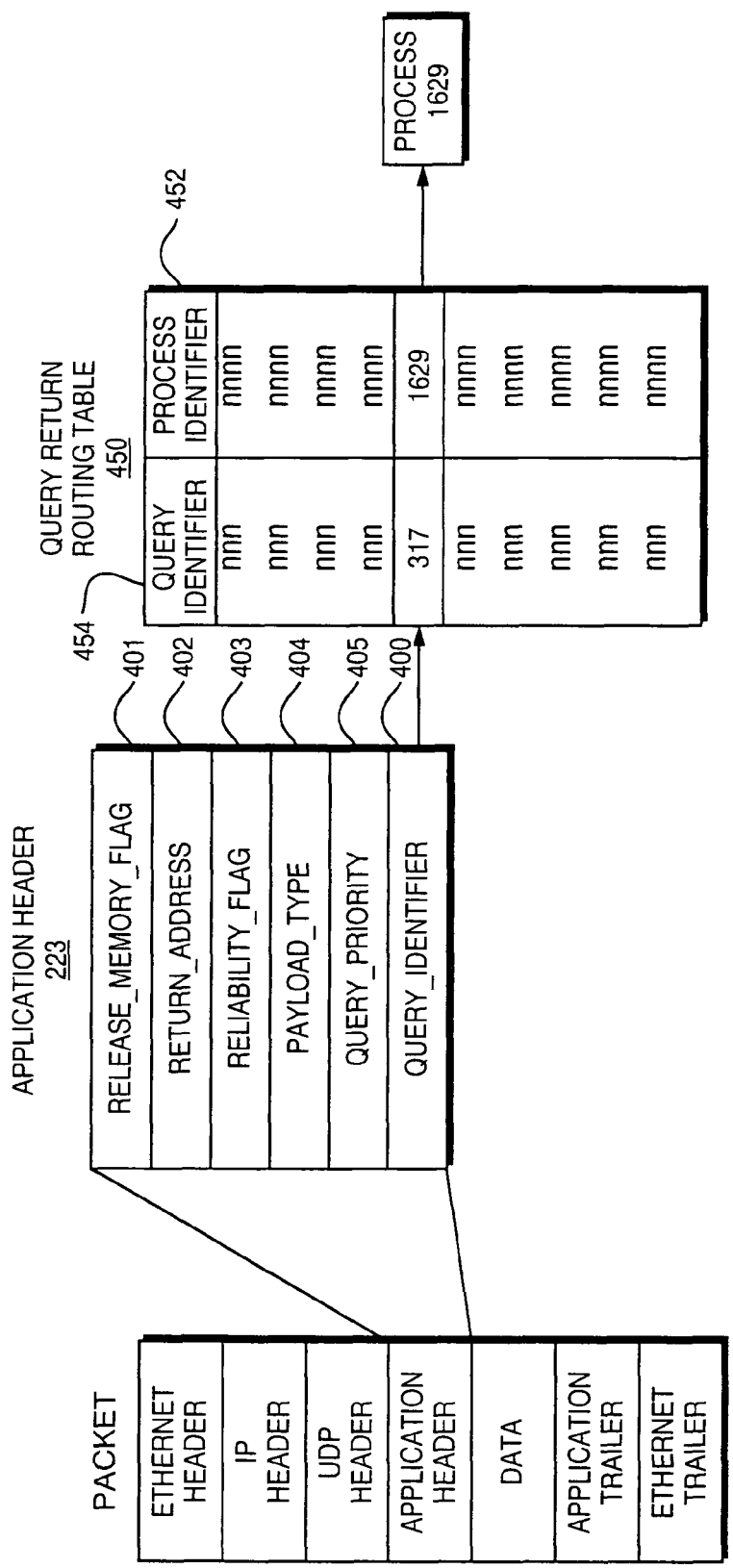
FIG. 6 shows how record sets from different database operation processing units may be routed to a single central database processor process.

Consider as one example the scenario depicted in FIG. 6. Here a packet is received at the central database processor 110. The application layer header is seen to contain a release memory flag 401, return address flag 402, reliability flag 403, payload type flag 404, query priority flag 405 and query identifier 406. A routing table 450 is maintained in the database application process that associates unique application process identifiers 452 with query identifiers 454. The query identifier 406 can thus be used with the routing table 450 to determine which process a packet should be sent to.

As mentioned above, the payload may contain an integral number of records so that the system may effectively stream records to the receiver. In the preferred embodiment, the packet size would typically be selected to be the smallest of the network layers' packet sizes among, for example, the selected Ethernet, UDP, and IP sizes. Even though a network stack is not required, by maintaining conventional headers, the system may use conventional network switches. The system conforms packets to the size and format required by whatever network components are utilized.

The receiver can thus operate on data in the packet even before the entire packet is received. This is in a contrast to a conventional system in which the entire packet must be recreated at the network or communication layer, therefore deferring the ability to perform application layer operations until the packet is completely received and, optionally, acknowledged. Because each packet has a self-contained set of records, processing, such as the 'join' operation described in FIG. 5 may proceed as packets are received in whatever order. The network layer does not have to store and maintain significant connection information, such as fragments. The network layer does not have to de-fragment. The system is also faster because a record can be operated on while it is in the processor's memory cache, which results in overall increased efficiency of the system, since the overhead associated with maintaining many partially completed connections is thereby avoided.

Having a network communication layer that is aware of application layer parameters also provides an additional advantage of having a reliability functionality on top of a conventionally unreliable communication layer process. For example, a UDP protocol is typically selected in implementations where speed is of utmost importance. UDP protocol processing proceeds more rapidly than other similar transport protocols, such as TCP, by eliminating message delivery guarantees, such as end-to-end acknowledgements of each packet.

Figure 7:
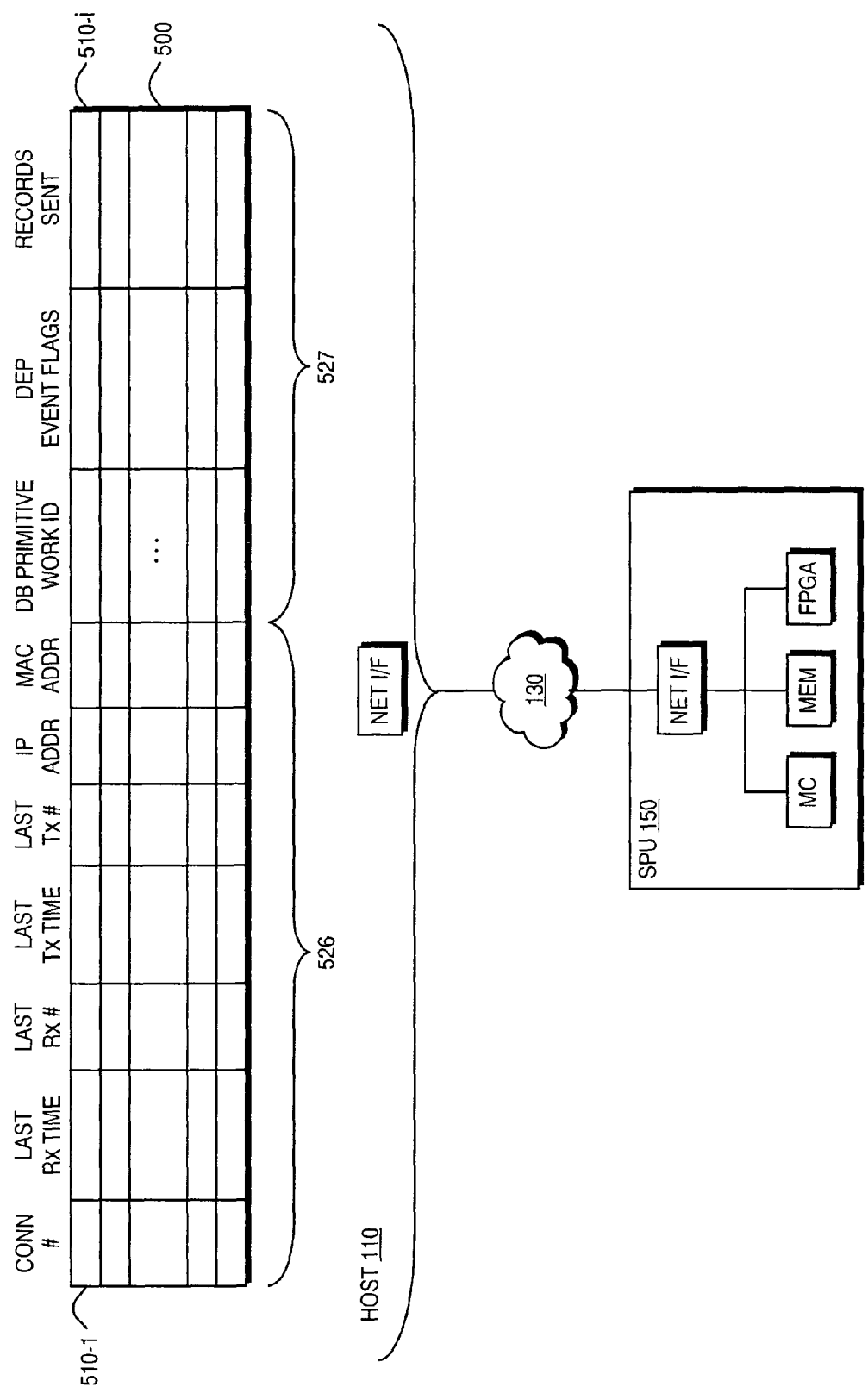
FIG. 7 illustrates how the application process may maintain connection information to provide reliable message delivery functions.

However, with the present invention, the sender application process may add sequence numbers to application headers so that receiver may perform certain types of reliable delivery checking. In one instance, for example, a sequence number may be added to application header 223 by the sender database operation processing unit 150-*i*. As shown in FIG. 7, this sequence number information permits the receiving communication process, for example, at the central database processor 110, to maintain a connection table 500 having entries 510-1, 510-2, ... 510-*c* associated with each active connection. The table may maintain parameters associated with assembling packets into complete messages, such as a last received time, last received packet number, last transmit time, last transmit packet number, IP layer address, MAC layer address and other communication link information. Maintaining this information, especially information concerning the last received and/or transmitted packet, can assist greatly in assembling messages.

Associated with each connection may also be database application information such as a database operation work ID, one or more dependent event flags, and a count of records sent. This table further can be used to assist the application layer processing. The connection table 500 thus maintains not only network layer information 526 but also application layer information associated with each connection.

The last packet sequence number received indication in the table can be used to determine if packets have been received out of sequence without the more conventional acknowledgement process. If, for example, a packet is received that has a lower sequence number than a packet which has already been received, then the information in the table 500 may be used by the communication process at the central database processor 110 to request resending of the missing packets.

Figure 8A:
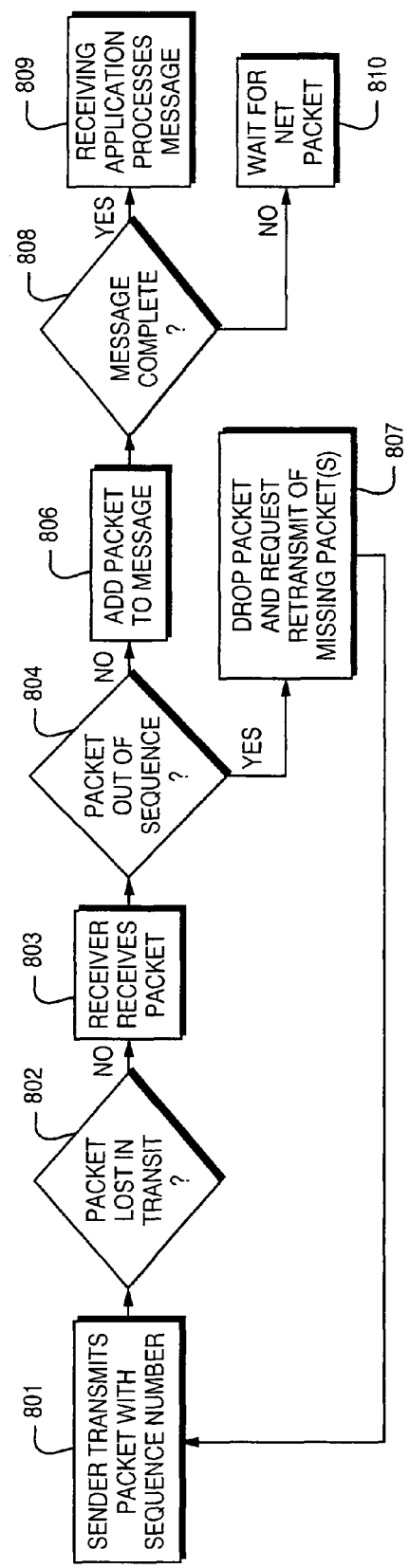
FIGS. 8A and 8B illustrate how dropped packets may be handled with TCP or UDP protocols, respectively.

Out-of-sequence packets may either be dropped or kept and processed depending upon the particular communication protocol in use. For example, systems using the TCP protocol typically drop out-of-sequence packets as shown in FIG. 8A. This process begins in a first step 801 with the sender transmitting a packet with a sequence number. In state 802, if a packet is not lost in transmit, then a receiver will receive it in state 803. Continuing to a state 804, it is determined if the packet is out-of-sequence. If this is not the case, then the packet may be added to the message in state 806. Processing then continues to a state 808 to determine if the message is now complete. If this is the case, then the receiving application process can finally begin to process the message in state 809. If it is not the case that the message is complete, then a state 810 is entered in which a communication process must then wait for the next packet. Returning back to state 804, if a packet was out-of-sequence at that point in the process, then in state 807 the packet is dropped and a request is returned to the sender requesting retransmission of the missing packets. In either event, application layer processing cannot begin until state 810 when the complete message has been received. Even if such a system keeps out-of-sequence packets in local memory, data cannot be processed by the application layer until the missing packets arrive and the entire message can be reassembled. Such a system is incapable of operating on individual packets because of this inter-packet dependence. Furthermore, the memory required to keep out-of-sequence packets may be so large as to make this approach impractical.

In a preferred embodiment, the receiving process saves and processes out-of-sequence packets immediately upon receipt, rather than requesting retransmission of the missing packet(s) and the out-of-sequence packets. The sending process can then retransmit only the missing packet(s), reducing processing overhead and network utilization.

Figure 8B:
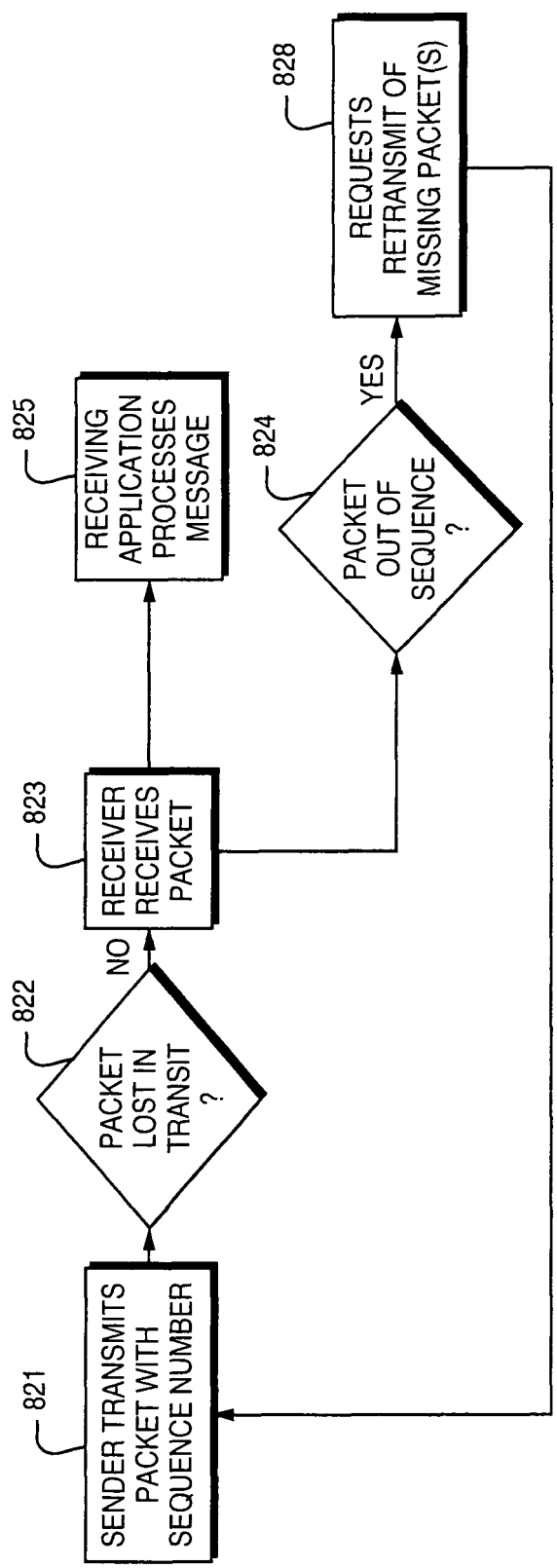

More particularly, as shown in FIG. 8B, in a first state 821, the sender transmits the packet with a sequence number. In state 822, if the packet is not lost in transmit, then a state 823 will be entered in which the receiver receives it. At this point, a state 825 may be entered such that the receiving application can begin to process the packet. In the meantime, a communication layer can, for example, continue to a state 824 where it is determined if the packet is out-of-sequence. If this is not the case, then no further action needs to be taken along this branch; however, if the packet is out of sequence, then a state 828 is entered in which retransmission of the missing packet is requested. It is thus understood how, therefore, with this process, the receiving application process can begin to work on packets as soon as they are received. Furthermore, there is a potential for reducing the amount of memory required by the receiving process in the circumstance where it performs a filtering database operation on the data contained in the out-of-sequence packets. Memory utilization in the receiving process may be further reduced by immediately returning the results of any operations performed on the data contained in a packet to the requesting application.

In addition, the central database processor may perform a sort of periodic acknowledgement of the last fragment of a database data set as opposed to acknowledging each packet.

An acknowledgement can also be piggybacked on the next packet from the central database processor to the database operation processing unit. In addition, there is a timeout mechanism so that if a routine message is not sent within the allotted time, a separate acknowledgment message is sent. The network process is extremely small and avoids memory allocations. The system maintains only one network process on each end, which is not only part of the streaming application but also can maintain thousands of connections. The system may be capable of TCP-like reliability at an application level with higher throughput than TCP for a given level of available processor resources.

While this invention has been particularly shown and described with references to preferred embodiments thereof, it will be understood by those skilled in the art that various changes in form and details may be made therein without departing from the scope of the invention encompassed by the appended claims.

What is claimed is:

1. A distributed data processing system for executing database operations comprising;
   (a) two or more data storage processors for coordinating and processing the storage and retrieval of database records;
   (b) at least one central database processor for processing database operations;
   (c) a network infrastructure providing for network connection of the data storage processors and at least one central database processor as network nodes to support communication of data among network nodes, the network infrastructure using a communication protocol;
   (d) a network interface configured to operate a communication process responsible for communicating data blocks in one or more messages communicated among network nodes, the communication process formatting the data blocks with a communication header;
   (e) an application process for executing database operations including coordinating storage and retrieval of data blocks, with portions of the application process executing on the data storage processors, and portions of the application process executing on at least one central database processor;
   (f) a memory coupled to the network interface and one of the network node processors, the application process and network interface having access to the memory such that the application process shares data blocks with the communication process by reference; and
   (g) the application process storing database operation information within the communication header, and generating and passing data block pointer information to the communication process for referencing a given data block.

2. The system as in claim 1 wherein a data storage processor also serves as a central database processor.

3. The system as in claim 1 wherein a portion of the application process executes in the network interface.

4. The system as in claim 1 wherein the communication process performs database operations on received data packets prior to forwarding them to the application process.

5. The system as in claim 1 wherein the database operations include one or more from the group of join, sort, aggregate, restrict, reject, expression evaluation or statistical analysis.

6. The system as in claim 1 wherein the communication process performs checksum operations on received data packets prior to forwarding them to the application process.

7. The system as in claim 1 wherein the communication process in a receiver processes data packets to determine routing information prior to passing them to the application process.

8. The system as in claim 1 wherein the application process executes in a central processing unit in the central database processor.

9. The system as in claim 1 wherein the network interface includes multiple network interface components that are individually addressable via the network infrastructure and are associated with the central database processor to provide a parallel processing architecture for processing parts of database queries in parallel among the two or more data storage processors.

10. The system as in claim 1 wherein source data and database primitive operation results from the communication process are stored in the memory accessible to a network interface component executing the communication process as well as to an application process executing on a central database processor.

11. A device for processing database operations comprising:
   (a) a processor for coordinating and processing the storage and retrieval of database records;
   (b) a network interface configured to operate a communication process responsible for communicating data blocks in one or more messages communicated among network nodes, the communication process formatting the data blocks with a communication header;
   (c) an application process for executing database operations including coordinating storage and retrieval of data blocks, at least a portion of the application process executing on the processor, wherein other portions of the application process executing on processors associated with other correspondin network nodes;
   (d) a memory coupled to the network interface and the processor, the application process and network interface having access to the memory such that the application process can share data blocks with the communication process by reference; and
   (e) the application process storing database operation information within the communication header, and generating and passing data block pointer information to the communication process for referencing a given data block.

12. The device as in claim 11 wherein the network interface executes a portion of the application process.

13. The device as in claim 11 wherein the communication process performs database operations on received data packets prior to forwarding them to the application process.

14. The device as in claim 13 wherein the database operations are further selected from a group including join, sort, aggregate, restrict, reject, expression evaluation, and statistical analysis.

15. The device as in claim 11 wherein the communication process processes performs checksum operations on received data packets prior to forwarding them to the application process.

16. The device as in claim 11 wherein the communication process processes data packets to determine routing information prior to passing them to the application process.

17. A method of executing database operations comprising,
   operating, at a network interface, a communication process to communicate data blocks in one or more messages communicated among two or more data storage processors and at least one central database processor as network nodes, the communication process formatting the data blocks with a communication header;
   operating an application process to execute database operations including coordinating storage and retrieval of data blocks, with portions of the application process executing on the data storage processors, and portions of the application process executing on the at least one central database processor, the application process storing database operation information within the communication header, and generating and passing data block pointer information to the communication process for referencing a given data block; and
   storing data to a memory coupled to the network interface and one of the data storage processors, the application process and network interface having access to the memory such that the application process can share data blocks with, the communication process by reference to the pointer information.

18. The method as in claim 17 wherein the communication process performs database operations on received data packets prior to forwarding them to an application process executing on the receiver.

19. The method as in claim 18 wherein the database operations include one or more from the group of join, sort, aggregate, restrict, reject, expression evaluation or statistical analysis.

20. A computer program product for executing database operations comprising:
   a computer readable storage medium having computer readable program code embodied therewith, the computer readable program code configured to:
   operate, at a network interface, a communication process to communicate data blocks in one or more messages communicated among two or more data storage processors and at least one central database processor as network nodes, the communication process formatting the data blocks with a communication header;
   operate an application process to execute database operations including coordinating storage and retrieval of data blocks, with portions of the application process executing on the data storage processors, and portions of the application process executing on the at least one central database processor, the application process storing database operation information within the communication header, and generating and passing data block pointer information to the communication process for referencing a given data block; and
   store data to a memory coupled to the network interface and one of the data storage processors, the application process and network interface having access to the memory such that the application process shares data blocks with the communication process by reference to the pointer information.

* * * * *